(12) United States Patent
Koizumi et al.

(10) Patent No.: US 9,100,499 B2
(45) Date of Patent: Aug. 4, 2015

(54) COMMUNICATION APPARATUS AND METHOD WITH OFF-HOOK DETECTION AND POWER SUPPLY CONTROL

(71) Applicant: CANON KABUSHIKI KAISHA, Tokyo (JP)

(72) Inventors: Shigeru Koizumi, Tokyo (JP); Michio Fukushima, Yokohama (JP); Eiji Ohara, Kawasaki (JP); Daisuke Suga, Kawasaki (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 14/288,454

(22) Filed: May 28, 2014

(65) Prior Publication Data

US 2014/0369490 A1 Dec. 18, 2014

(30) Foreign Application Priority Data

Jun. 18, 2013 (JP) .................................. 2013-127983

(51) Int. Cl.
| | |
|---|---|
| H04M 1/82 | (2006.01) |
| H04M 1/738 | (2006.01) |
| H04N 1/00 | (2006.01) |
| H04M 3/42 | (2006.01) |
| H04M 3/14 | (2006.01) |

(52) U.S. Cl.
CPC .............. *H04M 1/82* (2013.01); *H04M 1/7385* (2013.01); *H04N 1/0022* (2013.01); *H04M 3/14* (2013.01)

(58) Field of Classification Search
None
See application file for complete search history.

(56) References Cited

U.S. PATENT DOCUMENTS

| | | | |
|---|---|---|---|
| 2004/0032938 A1* | 2/2004 | Asami et al. ............. | 379/142.12 |
| 2010/0080381 A1* | 4/2010 | Tesu et al. ..................... | 379/413 |
| 2010/0202467 A1* | 8/2010 | Otani et al. ................... | 370/401 |

FOREIGN PATENT DOCUMENTS

JP 2009-171287 A 7/2009

* cited by examiner

*Primary Examiner* — Simon Sing
*Assistant Examiner* — Jeffrey Lytle
(74) *Attorney, Agent, or Firm* — Rossi, Kimms & McDowell LLP

(57) ABSTRACT

A communication apparatus has an off-hook detection function, and has a first electric power supply for supplying electric power to a telephone control unit for controlling a telephone apparatus, and a second electric power supply for supplying electric power to an off-hook detection unit for detecting an off-hook of the telephone apparatus. The apparatus causes the off-hook detection unit to detect an off-hook of the telephone apparatus when, from a first power mode, a second power mode, in which electric power consumption is less than in the first power mode, is transitioned into.

10 Claims, 3 Drawing Sheets

COMMUNICATION APPARATUS AND METHOD WITH OFF-HOOK DETECTION AND POWER SUPPLY CONTROL

BACKGROUND OF THE INVENTION

1. Field of the Invention

The present invention relates to a communication apparatus connectable to a telephone apparatus, a method of controlling the same, and a storage medium.

2. Description of the Related Art

In recent years, next generation networks (NGN: Next Generation Network) that perform voice communication by IP (Internet Protocol) telephone, image communication by IP-FAX communication by the ITU-T recommendation T.38, or the like, are widely used. An NGN is an IP network, provided with a bandwidth guaranteeing function and a security function for the network itself, which realizes integrally a telephone service, a video communication service, a data communication service, or the like.

In addition, SIP (Session Initiation Protocol), with which, a virtual session between communication devices on an NGN is established, and a service is provided while the session is established, has spread and is utilized. A communication device that established a session by SIP, performs a call or image communication using a protocol such as IP, VOIP (Voice Over IP), or the like, or various forms of services are provided such as these being performed simultaneously.

Here, in the communication apparatus, various functions are provided, and there those by which, as a telephone function, for example, an IP telephone or a telephone apparatus corresponding to a PBX (Private Branch Exchange), a telephone apparatus is connectable as an external telephone. For controlling the telephone apparatus corresponding to the PBX, for example, an SLIC (Subscriber Line Interface Circuit) is used.

In a SLIC there is a function for performing D/A and A/D conversion of call voice signals, a function for performing generation of call signals for sounding an incoming call tone of the telephone apparatus, a function for detecting an off-hook of the telephone apparatus, and the like. In general, because it is desirable that the telephone apparatus is always in a usable state, it is necessary to be in an operable state with electric power constantly being supplied to a telephone control unit (the previously described SLIC).

On the other hand, in communication apparatuses in recent years, there are those for which a power saving mode is arranged. When the communication apparatus transitions into the power saving mode, scaling down the consumption of the electric power of the communication apparatus on the whole becomes possible by stopping the electric power supply to a portion of the constituent elements.

In Japanese Patent Laid-Open No. 2009-171287, a configuration in which, in a facsimile apparatus to which a telephone apparatus is connected, an off-hook detection is performed by electric power supplied from a sub electric power supply after a power saving mode is transitioned into is disclosed.

There is an image communication apparatus in which an IPFAX function is included which is an image communication apparatus to which a telephone apparatus is connectable as an external telephone. Control of the connected telephone apparatus is realized by a SLIC (a telephone control unit) having functions such as voice data conversion, call signal generation, off-hook detection, or the like. In order to put the telephone apparatus into a state in which it is continuously usable (a continuously off-hook detection capable state), it is necessary to continuously supply electric power to the SLIC. However, because the SLIC consumes large amounts of electric power, electric power consumption becomes large when electric power is continuously supplied to the SLIC.

SUMMARY OF THE INVENTION

An aspect of the present invention is to eliminate the above-mentioned problems with the conventional techniques.

A feature of the present invention is to provide an arrangement in which an off-hook of a telephone apparatus is appropriately detected while restraining electric power consumption.

According to an aspect of the present invention, there is provided a communication apparatus, comprising: a telephone control unit configured to control a telephone apparatus and having an off-hook detection function; a first power supply unit configured to supply electric power to the telephone control unit; an off-hook detection unit configured to detect an off-hook of the telephone apparatus; a second power supply unit configured to supply electric power to the off-hook detection unit; and a control unit configured to control so that when, from a first power mode, a second power mode, for which electric power consumption is less than the first power mode, is transitioned into, the off-hook detection unit detects an off-hook of the telephone apparatus.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described hereinafter in detail, with reference to the accompanying drawings. It is to be understood that the following embodiments are not intended to limit the scope of the claims of the present invention, and that not all of the combinations of the aspects that are described according to the following embodiments are necessarily required with respect to the means to solve the problems according to the present invention.

Figure 1:
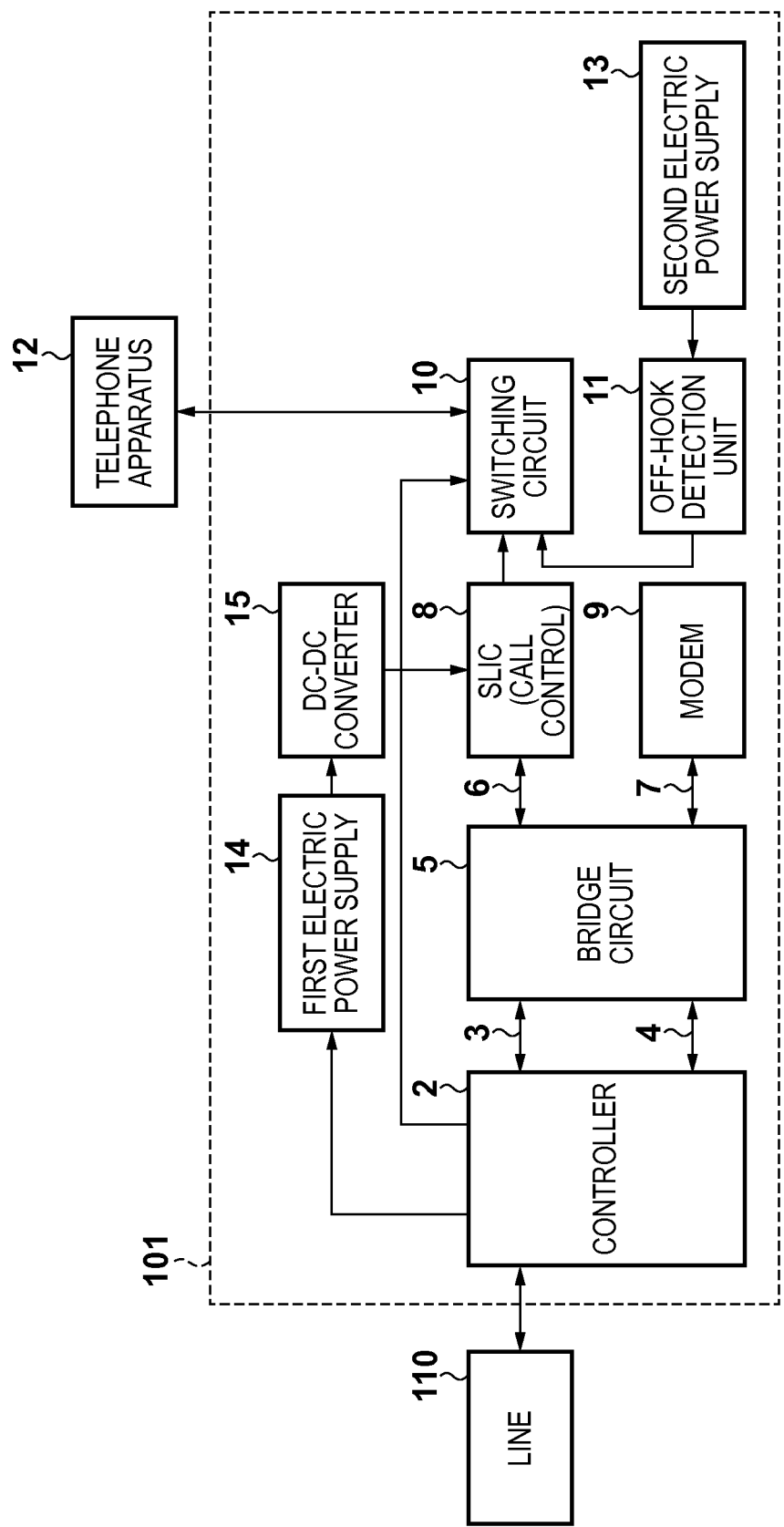
FIG. 1 is a block diagram for showing a configuration of an image communication apparatus according to embodiments of the present invention.

FIG. 1 is a block diagram for showing a configuration of an image communication apparatus 101 according to embodiments of the present invention.

A controller 2 is a control unit for controlling the image communication apparatus 101 on the whole. As main functions, the controller 2 controls data transmission and receiving, image scanning, image printing, or the like. A line 110 is connected to a network such as an intranet or the Internet, an NGN, or the like. An SLIC (Subscriber Line Interface Circuit) 8 performs a role as an interface of the line 110 and a telephone apparatus 12, usable having connected to a PBX, in order to connect the telephone apparatus 12 to an IP line. The SLIC 8 has call signal generation, direct-current electricity application, and off-hook detection functions, or the like. Furthermore, the SLIC 8 is provided with a CODEC function for performing A/D or D/A conversion of call transmission/ call reception signals via the telephone apparatus 12. Furthermore, the SLIC 8 is provided with an SPI interface and a PCM interface function for interfacing with the controller 2. This SLIC circuit 8 has a characteristic that electric power consumption is comparably large because it is generating the call signal, direct-current electricity transmitted to the telephone apparatus 12, or the like.

The controller 2 and a bridge circuit 5 are provided with UARTs (Universal Asynchronous Receiver Transmitter) for both directions, and the controller 2 exchanges data by serial communication with the SLIC (the telephone control unit) 8 via a data line 3, the bridge circuit 5, and a data line 6. In addition, the controller 2 similarly exchanges data by serial communication with a modem 9 via a data line 4 and a data line 7. The bridge circuit 5 functions as an adjustment circuit for generating a timing of serial data transmission and receiving of a UART of the controller 2 and the SLIC 8 or the modem 9. The modem 9 is a G3 modem for FAX, and is used upon VOIP_G3 communication.

A switching circuit 10 is a circuit for switching a connection depending on whether an off-hook detection of the telephone apparatus 12 is made by the SLIC 8, or is detected by an off-hook detection unit 11. A first electric power supply 14 is a large capacity electric power supply for supplying electric power to various units upon operation in a normal power mode (a first power mode), and when a power saving mode (a second power mode) in which electric power consumption is smaller than in the normal power mode, that supply of electric power is stopped by a control of the controller 2. On the other hand, a second electric power supply 13 is a low capacity electric power supply for constantly supplying electric power, which comprises a high efficiency electric power supply which supplies electric power when in the power saving mode. A DC-DC converter 15 generates call signals of the telephone apparatus to be generated by the SLIC 8, a direct-current voltage supplied to a line of the telephone apparatus 12, or the like.

Next, explanation is given below for operation after the image communication apparatus 101 transitions into the power saving mode.

In the power saving mode, the electric power supply from the first electric power supply 14 being supplied to the SLIC 8 is stopped. At this time, the controller 2 switches with the switching circuit 10 in order to connect the telephone apparatus 12 and the off-hook detection unit 11. Furthermore, in the power saving mode, electric power is supplied from the second electric power supply 13 to the off-hook detection unit 11. By controlling in this way, because the electric power supply to the SLIC 8 is stopped in the power saving mode, it becomes possible for the electric power consumption for telephone control to be reduced when in the power saving mode. Note, the stopping of the electric power supply to the SLIC 8 means that the SLIC 8 substantially does not operate, and includes that a minute amount of electric power continues to be supplied. In addition, here it is assumed that the telephone function in the power saving mode is only the off-hook detection, but configuration may also be taken such that functions other than that operate in the power saving mode. In the power saving mode, when the off-hook detection unit 11 detects an off-hook of the telephone apparatus 12, it activates the SLIC 8, and by connecting the telephone apparatus 12 and the SLIC 8 by the switching circuit 10, a function of the telephone apparatus 12 is caused to work.

Figure 2:
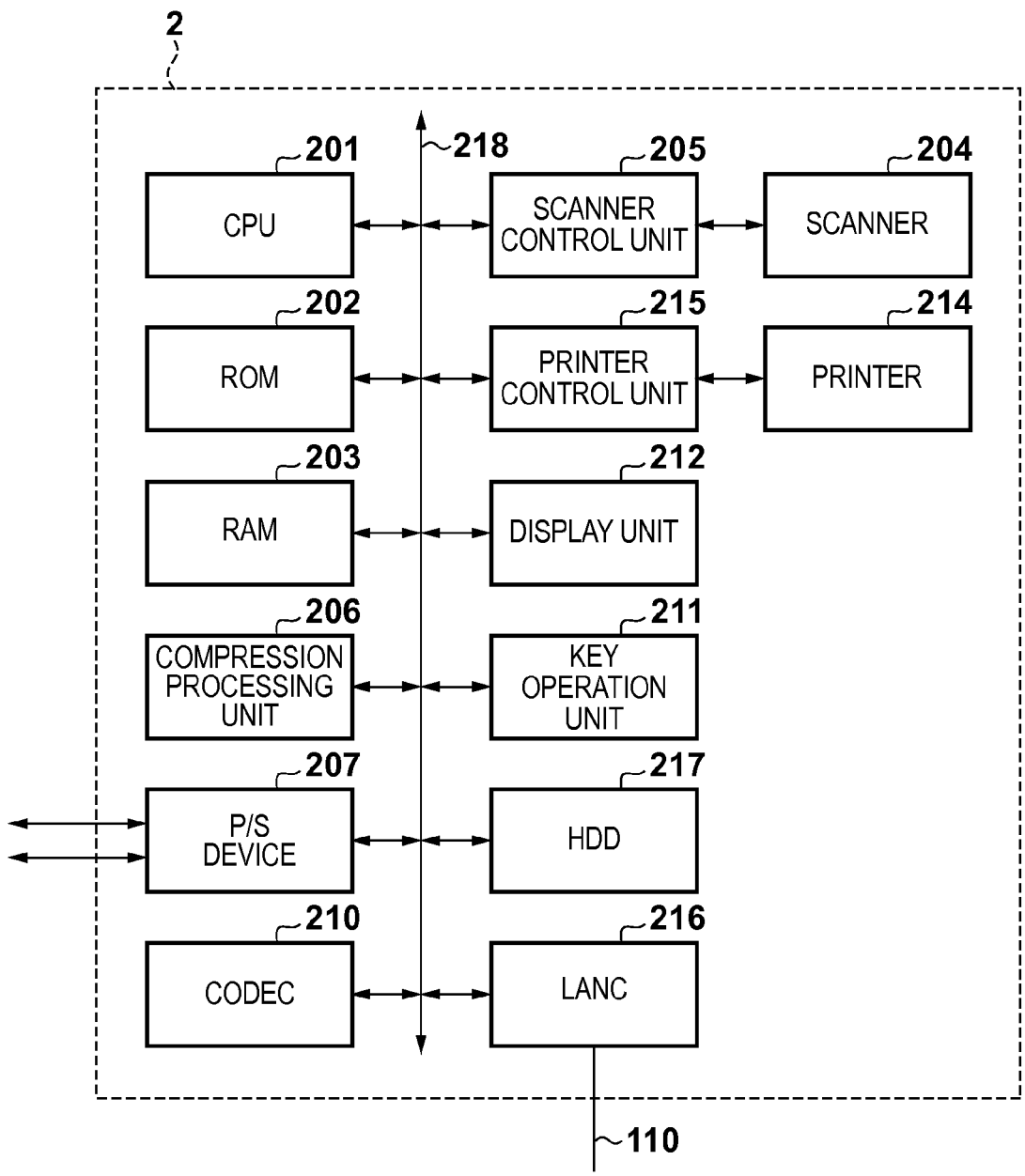
FIG. 2 is a block diagram for showing an overview of a configuration of a controller of the image communication apparatus according to embodiments.

When in the power saving mode, circuits to which electric power is not supplied, are, for example, a printer control unit 215, a printer 214, a scanner control unit 205, and a scanner 204 of FIG. 2, the SLIC 8, or the like. On the other hand, circuits for which operation is necessary even when in the sleep mode are, for example, a CPU peripheral circuit, a CPU 201, a ROM 202, a RAM 203, an LANC 216, a portion of a key operation unit 211, a display unit 212, or the like, of FIG. 2, the switching circuit 10, the off-hook detection unit 11, or the like.

FIG. 2 is a block diagram for showing an overview of a configuration of a controller 2 of the image communication apparatus 101 according to embodiments.

In the FIG. 2, the CPU 201, as well as controlling each unit connected to the CPU 201 in accordance with a program stored in the ROM 202, controls the image communication apparatus 101 on the whole. In addition, the CPU 201 performs TCP/IP protocol processing, and assembling of image data into a TCP/IP frame is performed by control of the CPU 201. The CPU 201 also decodes image data encoded upon receipt of image data. The RAM 203, in addition to being used as a work memory upon program execution by the CPU 201, is used for buffering of transmitted and received image data. A P/S device 207 is a UART, which performs parallel/serial conversion of data, and is connected to the bridge circuit 5. In addition, a CODEC 210 supports a VoIP encoding/decoding mode for voice signals or facsimile signals transmitted as "treated as audio". Furthermore, it is assumed that at least an encoding/decoding mode necessary for transmitting and receiving T.38 Internet facsimile signals (in particular tone signals) is supported.

An operation unit includes the key operation unit 211 and the display unit 212, and the key operation unit 211 has a numeric keypad used mainly for dial numbers, start and stop keys, an operation button for facsimile transmission and receiving, a display device, or the like, which receives operation instructions from a user. Alternatively, the display unit 212 is used for displaying of various information, receiving instruction input from the user, or the like. The scanner control unit 205 controls the scanner 204 to output, to a bus 218, image data obtained by scanning an original with a scanner 204. A compression processing unit 206 is used for compressing image data obtained by scanning an original, for example. The printer control unit 215 controls the printer 214, which prints by a recording method such as an electrophotographic printing method, an ink-jet method, or the like. The printer control unit 215 converts received image data, image data input from another interface, or the like, into raster data for printing, and outputs to the printer 214. An HDD 217 is a hard disk drive which is used for storage of print data such as received image data, transmitted image data, or the like, and for storage of various data. The network I/F control unit (the LANC) 216 is a LAN controller which performs data transmission and receiving through the network line 110. The CPU 201 transfers data to be transmitted to the LAN controller of the network I/F control unit 216. The LANC 216 adds transmission data such as a MAC (Media Access Control) frame header, an FCS (Frame Check Sequence), or the like, and transmits to the network line 110.

The bus 218 connects the CPU 201, the RAM 203, the ROM 202, the scanner control unit 205, the compression processing unit 206, the P/S device 207, the CODEC 210, the LANC 216, the HDD 217, or the like. Also, the bus 218 is a system bus for transmitting control signals from the CPU 201, various control unit data signals, and the like.

Figure 3:
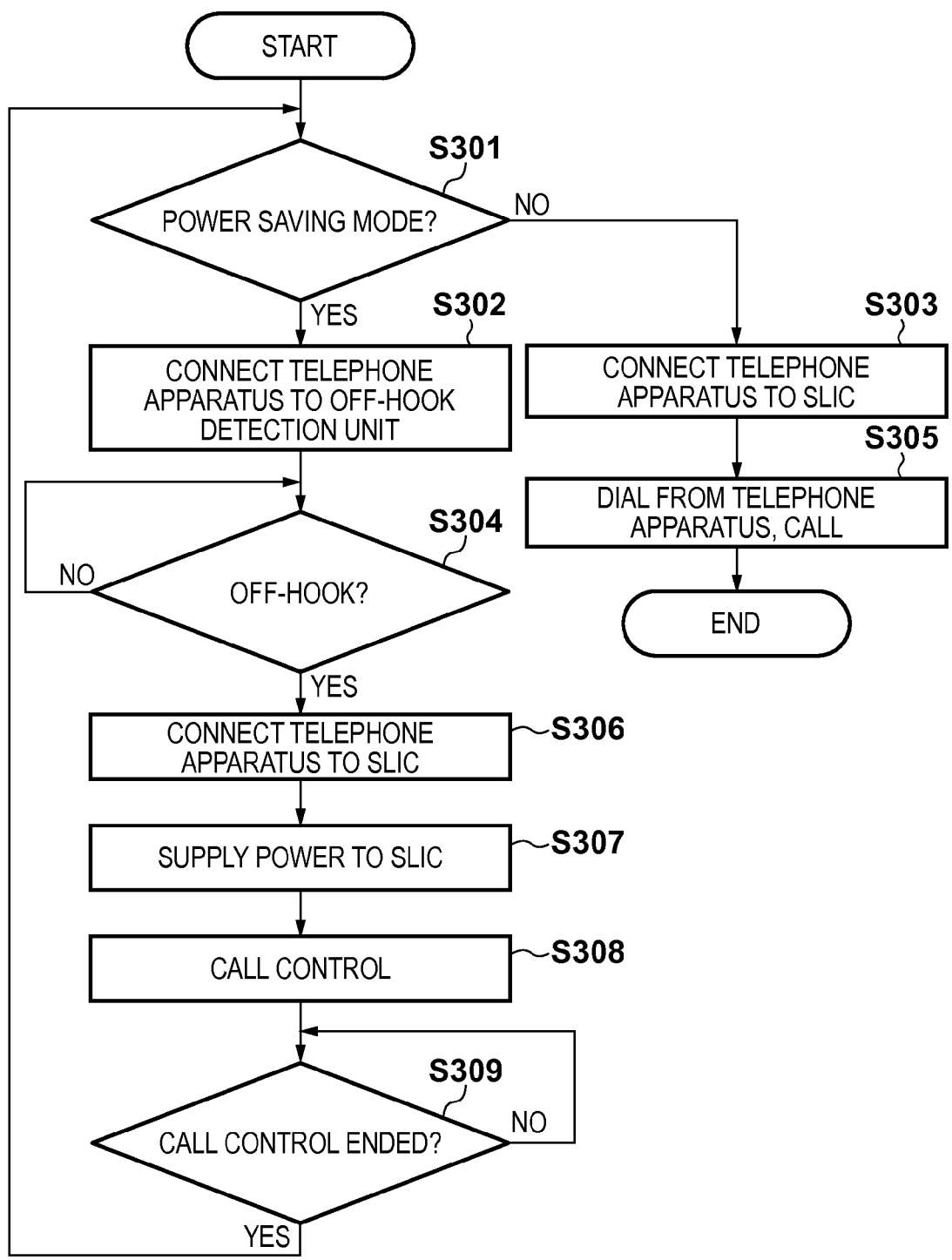
FIG. 3 is a flowchart for describing processing by the image communication apparatus according to embodiments of the present invention.

FIG. 3 is a flowchart for describing processing by the image communication apparatus 101 according to embodiments of the present invention. A program for executing the processing shown in this flowchart is stored in the ROM 202, and the processing shown by this flowchart is realized by the CPU 201 executing this program. Here, operation of the telephone control unit in a case where the image communication apparatus 101 is in the power saving mode, and operation of the telephone control unit in a case where the image communication apparatus 101 is in the normal power mode is explained. Note, the telephone control unit includes the SLIC (telephone control) 8, the switching circuit 10, the off-hook detection unit 11, the second electric power supply 13, the first electric power supply 14, or the like. Note, the normal power mode is a state in which power supply is performed by the first electric power supply 14.

Firstly, in step S301, the CPU 201 determines whether or not a power mode of the image communication apparatus 101 is the power saving mode. In a case where the power mode is not the power saving mode, i.e. the power mode is the normal power mode, the processing proceeds to step S303, and the telephone apparatus 12 and the SLIC 8 are connected by the switching circuit 10. At this time, electric power is supplied to the SLIC 8 from the first electric power supply 14. Then, in step S305, it is possible that dialing is performed from the telephone apparatus 12 through the SLIC 8, and a call is performed. At this time, the SLIC 8 detects an off-hook of the telephone apparatus 12. In this state, because the electric power is supplied from the first electric power supply 14 to the SLIC 8 even when on waiting, the SLIC 8 is continuously in an operational state, and electric power consumption becomes large.

On the other hand, when the CPU 201, in step S301, determines that the power mode is the power saving mode, the processing proceeds to step S302, and the CPU 201 disconnects the connection between the telephone apparatus 12 and the SLIC 8 with the switching circuit 10, and switches so that the telephone apparatus 12 and the off-hook detection unit 11 are connected. Because at this time the first electric power supply 14 is off, the electric power supply to the SLIC 8 from the first electric power supply 14 is stopped, and electric power from the second electric power supply 13 to the off-hook detection unit 11 is supplied. This second electric power supply 13 is on continuously, and is an electric power supply having high efficiency because it only supplies electric power to a portion of the circuits for which electric power supply is necessary in the power saving mode. In this way, in the power saving mode, it is possible to restrain electric power consumption to less compared to a case where an off-hook is detected by the SLIC 8 due to performing the off-hook detection of the telephone apparatus 12 with the off-hook detection unit 11.

Next the processing proceeds to step S304, and the CPU 201 determines whether or not an off-hook is detected by the off-hook detection unit 11 in the power saving mode. In step S304, when it is determined that an off-hook is detected, the processing proceeds to step S306, and the CPU 201 connects the telephone apparatus 12 and the SLIC 8 with the switching circuit 10. Then, the processing proceeds to step S307, and the CPU 201 supplies, to the SLIC 8, the DC-DC converter 15, or the like, electric power from the first electric power supply 14 by turning on the first electric power supply 14 in order to restart the electric power supply to the SLIC 8 from the first electric power supply 14. With this, the SLIC 8 operates, and in step S308, by the control of the SLIC 8, dialing and calling with the telephone apparatus 12 become possible. Then, the processing proceeds to step S309, the CPU 201, monitors an operation state of the telephone apparatus 12, and the CPU 201 determines a call termination when an on-hook of the telephone apparatus 12 is detected by the SLIC 8, and moves the processing to step S301.

As explained above, by virtue of the present embodiment, in a case where a telephone apparatus is connected as an external telephone to an image communication apparatus equipped with an IPFAX function, an off-hook detection of that telephone apparatus is performed by an SLIC (telephone control unit) in a normal power mode. On the other hand, in a power saving mode, off-hook detection is performed using a separate off-hook detection circuit having small electric power consumption. By doing this, it is possible to reduce electric power consumption for detecting an off-hook in a power saving mode compared to a case where detecting is performed by an SLIC.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-127983, filed Jun. 18, 2013, which is hereby incorporated by reference herein in its entirety.

What is claimed is:

1. A communication apparatus, comprising:
    a telephone control unit configured to control a telephone apparatus and having an off-hook detection function operable in a first power mode;
    a first power supply unit configured to supply electric power to the telephone control unit;
    an off-hook detection unit configured to detect an off-hook of the telephone apparatus in a second power mode for which electric power consumption is less than the first power mode;
    a second power supply unit configured to supply electric power to the off-hook detection unit; and
    a control unit configured to control so that when the communication apparatus operates in the first power mode, the telephone control unit detects an off-hook of the telephone apparatus, and when the communication apparatus operates in the second power mode, the off-hook detection unit, instead of the telephone control unit, detects the off-hook of the telephone apparatus.

2. The communication apparatus according to claim 1, wherein the control unit, when transition is performed from the first power mode to the second power mode, stops an electric power supply to the telephone control unit from the first power supply unit.

3. The communication apparatus according to claim 1, wherein the control unit restarts an electric power supply to the telephone control unit from the first power supply unit when the off-hook detection unit detects the off-hook of the telephone apparatus.

4. The communication apparatus according to claim 1, wherein the telephone control unit includes an SLIC (Subscriber Line Interface Circuit).

5. The communication apparatus according to claim 1, wherein the electric power supply capacity of the first power supply unit is larger than the electric power supply capacity of the second power supply unit.

6. The communication apparatus according to claim 1, wherein the electric power consumption of the off-hook detection unit is less than the electric power consumption of the telephone control unit.

7. The communication apparatus according to claim 1, further comprising
a switching unit configured to switch between a state in which the telephone apparatus and the telephone control unit are connected, and a state in which the telephone apparatus and the off-hook detection unit are connected, wherein
the control unit switches between a connection between the telephone apparatus and the telephone control unit and a connection between the telephone apparatus and the off-hook detection unit by controlling the switching unit.

8. A method of controlling a communication apparatus having a first electric power supply for supplying electric power to a telephone control unit for controlling a telephone apparatus and having an off-hook detection function operable in a first power mode, and a second electric power supply for supplying electric power to an off-hook detection unit for detecting an off-hook of the telephone apparatus in a second power mode for which electric power consumption is less than the first power mode, the method comprising:
controlling so that when the communication apparatus operates in the first power mode, the telephone control unit detects an off-hook of the telephone apparatus, and when the communication apparatus operates in the second power mode, the off-hook detection unit, instead of the telephone control unit, detects the off-hook of the telephone apparatus.

9. The method of controlling a communication apparatus according to claim 8, wherein when the off-hook of the telephone apparatus is detected, electric power supply to the telephone control unit from the first electric power supply is restarted, and also the telephone apparatus and the telephone control unit are connected.

10. A non-transitory computer-readable storage medium storing a program for causing a computer to function as a communication apparatus comprising:
a telephone control unit configured to control a telephone apparatus and having an off-hook detection function operable in a first power mode;
a first power supply unit configured to supply electric power to the telephone control unit;
an off-hook detection unit configured to detect an off-hook of the telephone apparatus in a second power mode for which electric power consumption is less than the first power mode;
a second power supply unit configured to supply electric power to the off-hook detection unit; and
a control unit configured to control so that when the communication apparatus operates in the first power mode, the telephone control unit detects an off-hook of the telephone apparatus, and when the communication apparatus operates in the second power mode, the off-hook detection unit, instead of the telephone control unit, detects the off-hook of the telephone apparatus.

* * * * *